United States Statutory Invention Registration [19]

[11] Reg. Number: H928

Gallegos [43] Published: Jun. 4, 1991

[54] LIQUID COMPRESSING GAS SYSTEM

[76] Inventor: Francisco F. Gallegos, 2041 Severus Dr., Vallejo, Calif. 94589

[21] Appl. No.: 459,173

[22] Filed: Dec. 29, 1989

[51] Int. Cl.[5] ..... F04B 45/04

[52] U.S. Cl. ..... 417/395

[58] Field of Search ..... 417/395, 92, 101, 392, 417/394, 103, 102, 383

[56] References Cited

U.S. PATENT DOCUMENTS

| | | | |
|---|---|---|---|
| 865,424 | 9/1907 | McFarlane | 417/101 |
| 2,478,321 | 8/1949 | Robbins | 417/103 |
| 3,168,045 | 2/1965 | Sebastiani | 417/383 |
| 3,496,879 | 2/1970 | Brandes | 417/395 |
| 3,586,461 | 6/1971 | Erlandson | 417/383 |
| 4,316,703 | 2/1982 | Kunzelman | 417/103 |

*Primary Examiner*—Michael J. Carone

[57] ABSTRACT

A gas system using a liquid to provide an oil-free, virtually noiseless positive/negative pressure to a pressure vessel. A high-pressure gas-storage reservoir, a compression tank and a pump liquid supply reservoir are interconnected by a series of valves. To provide a high positive pressure to a gas, a low pressure gas is admitted to the compression tank and then liquid is pumped from the storage reservoir into the tank, which has a flexible membrane separating the gas and the liquid. The liquid compresses the gas which is then vented out of the compression tank to the gas storage reservoir and the pump liquid is drained back into the liquid supply reservoir. A low pressure may be applied to the compression tank by first filling the tank with liquid and closing all inlet valves. Then a drain valve is opened to the liquid supply reservoir causing evacuation of the tank.

4 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LIQUID COMPRESSING GAS SYSTEM

STATEMENT OF GOVERNMENT INTEREST

The invention described herein may be manufactured and used by or for the Government of the United States of America for governmental purposes without the payment of any royalties thereon or therefor.

BACKGROUND OF INVENTION

1. Field of Invention

The invention relates to a noiseless oil-free gas system for providing a high or low pressure gas to a pressure vessel.

2. Description of Prior Art

Conventional gas compressors are generally piston driven devices in which the gas to be compressed is injected into the compression chamber and then a piston moving in a cylinder compresses the gas. The high-pressure gas is vented to a storage container or another compression stage and additional gas is injected into the compression chamber. Such pumps are generally very noisy as a result of the moving piston and the alternating opening and closing of the inlet/outlet valves producing a pulsating source of compressed gas. Such noise is very undesirable in most military submersible vehicles. Further, lubricating oil along the cylinder wall contaminates the compressed gas in most systems such that the high pressure air is not breathable. Multi-stage devices, or those yielding oil-free compressed gas, are still noisy and are generally large, complex and require high levels of maintenance. Similar limitations exist in conventional vacuum pumps. Other prior art devices which have storage reservoirs containing a liquid and a gas under pressure usually require some compensating mechanism to adjust for the gas absorbed by the liquid when under pressure in order to maintain the device at a desired operational state. The present device can convert a low-pressure gas to a high-pressure one or vice versa in a virtually noiseless, continuous, single operation. Further, the gas so produced is oil-free and no compensating mechanism is required to adjust for any gas absorbed by the liquid.

SUMMARY OF INVENTION

Briefly described is an apparatus using a pump liquid acting on a gas in a compression chamber to provide a vacuum or a breathable high-pressure gas in a single virtually noiseless operation.

The primary object of invention is to provide a system having capability to convert a low-pressure gas to a desired high-pressure or vice versa in a noiseless, oil-free operation using a pump liquid.

DESCRIPTION OF THE ORIGINAL DRAWING

FIG. 1 is a schematic of the preferred embodiment of the invention.

DESCRIPTION OF THE PREFERRED EMBODIMENT

Figure 1:
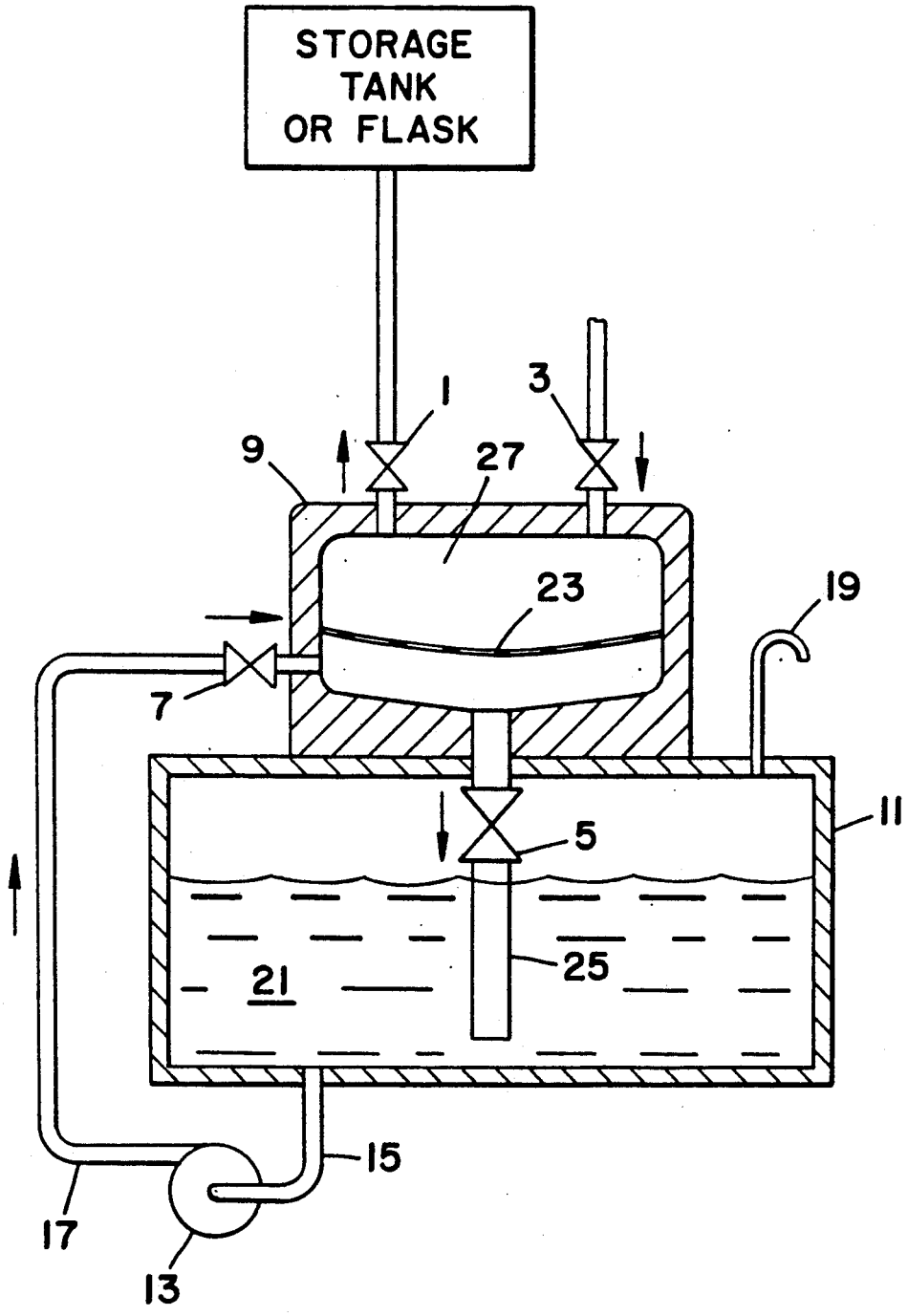

Referring to FIG. 1, operation of the present invention is described. An exhaust valve 1 for the compressed gas, a supply valve 3 for input of the gas to be compressed, a liquid drain valve 5 and a liquid supply valve 7 are connected as shown to a pressurization/vacuum tank 9. Located adjacent the pressurization/vacuum tank 9 is a liquid supply tank 11 containing a supply of the pump liquid 21. A centrifugal pump 13 is connected between a suction line 15 to the supply tank 11 and a liquid supply line 17 connected to the liquid supply valve 7. A vent 19 is located atop the liquid supply tank 11.

Operating the present invention as a compressor, the exhaust valve 1, liquid drain valve 5 and liquid supply valve 7 are opened. Then supply gas valve 3 is opened to admit a gas 27 into the compression chamber 9. Gas supply valve 3 is then closed; the liquid supply valve 7 opened; and the centrifugal pump 13 started. The pump liquid 21 in liquid supply tank 11 is taken out via the suction line 15 and input via the liquid supply line 17 to the pressure/vacuum tank 9 subsequently compressing the gas 27. An optional flexible, impermeable diaphragm 23 may be installed if separation of the liquid 21 from the gas 27 is required. Whenever the gas 27 is compressed to the desired pressure, the pump 13 is disengaged; the liquid supply valve 7 is closed; and the compressed gas 27 is vented to a storage tank or to the atmosphere. Drain valve 5 is then opened to drain the pump liquid 21 back into the liquid supply tank 11.

To obtain a vacuum in tank 9, an optional drain line 25 can be extended in length as shown. Then, with gas outlet valve 1, gas inlet valve 3 and liquid supply valve 7 closed, the liquid drain valve 5 is opened which will result in evacuating the tank 9.

Thus the present invention provides a virtually noiseless, oil-free, low-maintenance gas system capable of providing a wide range of positive/negative pressures to single/multiple gas/liquid pressure tanks simultaneously or separately in a single continuous operation. Further, since all gas in the system is exhausted from pressure tank 9 each cycle, the system does not require purging when the gas is changed.

Although the present invention has been described with reference only to a single pressure tank and single liquid supply tank, it is apparent that it may be practiced in other modifications than those taught without departing from the scope of the appended claims.

What is claimed is:

1. A gas system for providing an oil-free pre-determined pressure to a gas comprising:

(a) means for holding said gas to which said pressure is provided, said holding means having an inlet valve and an outlet valve for said gas, said holding means further having a liquid supply valve for supplying liquid to said holding means and a drain valve for draining said liquid from said holding means;

(b) means for storing said liquid to be supplied to said holding mean; and (c) means for transferring said liquid from said storing means to said holding means.

2. The gas system of claim 1 wherein said holding means has a hollow inner chamber with a flexible, impermeable membrane separating said liquid from said gas.

3. The gas system of claim 1 wherein said storing means is a hollow storage reservoir positioned below said holding means.

4. The gas system of claim 1 wherein said transferring means further comprises:

(a) a suction line for transporting liquid out of said storing means;

(b) a liquid supply line for conveying said liquid taken by said suction line from said storing means to said liquid supply valve of said holding means; and (c) a centrifugal pump operably connected between said suction line and said liquid supply line.

* * * * *